United States Patent [19]

Maulding

[11] 3,911,038

[45] Oct. 7, 1975

[54] PROCESS FOR MAKING BIS(PHENYLETHYLNYL)ANTHRACENES

[75] Inventor: Donald Roy Maulding, Somerville, N.J.

[73] Assignee: American Cyanamid Company, Stamford, Conn.

[22] Filed: Mar. 25, 1974

[21] Appl. No.: 454,352

[52] U.S. Cl. .......................................... 260/668 F
[51] Int. Cl.² ........................................ C07C 15/28
[58] Field of Search .................. 260/668 F, 683.2; 252/301.2

[56] References Cited
UNITED STATES PATENTS

| | | | |
|---|---|---|---|
| 3,213,155 | 10/1965 | Schriesheim et al. | 260/683.2 |
| 3,217,050 | 11/1965 | Schriesheim et al. | 260/683.2 |
| 3,270,084 | 8/1966 | Schriesheim et al. | 260/683.2 |
| 3,399,137 | 8/1968 | Rauhut et al. | 252/188.3 |
| 3,517,073 | 6/1970 | Fields | 260/668 F |
| 3,557,233 | 1/1971 | Zweig et al. | 260/668 F |
| 3,729,426 | 4/1973 | Zweig et al. | 252/301.2 R |

*Primary Examiner*—Veronica O'Keefe
*Attorney, Agent, or Firm*—Gordon L. Hart; Charles J. Fickey

[57] ABSTRACT

An improved method is described for preparing bis(phenylethynyl)anthracenes by reacting a quinone with the lithium salt of phenylacetylene to obtain a dihydro-dihydroxy-bis(phenylethynyl)anthracene, and converting the latter compound in situ to the corresponding bis(phenylethynyl)-anthracene. The products are useful as fluorescers in chemiluminescent systems.

11 Claims, No Drawings

PROCESS FOR MAKING BIS(PHENYLETHYLNYL ANTHRACENES

BACKGROUND OF THE INVENTION

This invention relates to an improved method for preparing bis(phenylethynyl)anthracenes, more specifically 9,10-bis(phenylethynyl)anthracenes. The 9,10-bis(phenylethynyl)-anthracenes prepared by the method of this invention can be illustrated in Formula I

I wherein $R_1$ is hydrogen, halogen, alkyl $C_1$–$C_4$, and aryl, and $R_2$ is

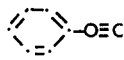

The phenylethynyl-substituted anthracene compounds may be prepared by the reaction of aromatic quinones with lithium phenylacetylide and subsequent reduction of the isolated diol with stannous chloride, as described by W. Reid, Neuere Methoden der Preparativen Organischen Chemie, Band IV, Verlag Chemie, CmbH, Weinheim/Bergstrasse, 1968, p 98. The general reaction scheme is shown in Flow Sheet 1.

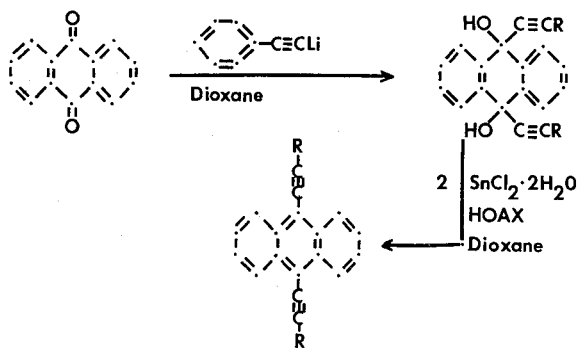

SUMMARY OF THE INVENTION

We have now found that by reacting a quinone with lithium phenylacetylide in a mixture of dioxane and a cosolvent and subsequently reducing the intermdeiate dihydro diol in situ, bis(phenylethynyl)anthracenes can be obtained in higher yields than obtained by the process of the prior art. When the phenylethynylanthracene-type compound of the novel process of this invention is a 9,10-bis(phenylethynyl)anthracene, it may be any substituted form thereof such as with (a) alkyl substituents containing from about 1 to about 8 carbon atoms, (b) chlorine, (c) fluorine, (d) carboxy, (e) alkoxy $C_1$–$C_6$, (f) aryloxy, and (g) aryl, and the like.

In the following representative structural formula of 9,10-bis(phenylethynyl)anthracene, Formula II, the positions suitable for substitution have been numbered in the conventional way from 1 to 10 on the anthracene nucleus to illustrate that the phenylethynylanthracene may be substituted at any one or more of positions 1–4 and 5–8 by a substituent such as those listed above.

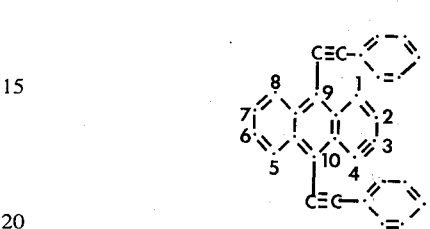

II

The preferred phenylethynylanthracene-type compound of the process of this invention is 9,10-bis(-phenylethynyl)-anthracene, shown above.

Phenylethynyl-substituted hydrocarbons are useful for increasing fluorescence efficiency and color flexibility in fluorescent systems.

The process of the present invention is similar to that described in Reid up to and including the formation of lithium phenylacetylide and the addition of quinone to the reaction mixture. At this point in the process of this invention, a cosolvent is added to the reaction mixture, either before the addition of the quinone or subsequent to the addition, to solubilize any insoluble gel-like material which may form on the addition of the quinone. It is, of course, obvious that rather than forming the alkali phenylacetylide in situ one could also start with the alkali phenylacetylide preformed. Lithium phenylacetylide is the preferred alkali salt of this invention because of its higher solubility.

Exemplary of solvents which may be employed as cosolvents in the process of this invention are N,N-dimethylformamide, N,N-diethylformamide, N,N-dipropylformamide, N,N-dimethylacetamide, N,N-diethylacetamide, N,N-dipropylacetamide, $N^1,N^1,N^3,N^3$-tetramethylurea, 1-methyl-2-pyrrolidone, 1-methyl-2-piperidone, and the like. The preferred cosolvent is N,N-dimethylformamide. The cosolvent alternatively can be added to the reaction mixture prior to the addition of the quinone. We have found that a mixture of dioxane and N,N-dimethylformamide is particularly suitable in that the dihydro diol intermediate is more easily handled in situ.

The reaction mixture is then heated at a temperature below 100°C. to form the intermediate dihydro-dihydroxy-bis-(phenylethynyl)anthracene which is subsequently reduced in situ by stannous chloride.

While the stannous chloride may be added to the reaction mixture as a solid, it is preferable to either dissolve the stannous chloride or slurry it in a cosolvent; the reduction reaction may then be effected by adding stannous chloride solution or slurry to the reaction mixture, or vice versa. The reduction reaction is carried out at temperatures ranging from room temperature to 40°C., preferably at about room temperature, using from 1 to 4 moles of stannous chloride, preferably from 2.0 to 2.2 moles of stannous chloride per mole of quinone employed.

In the process of this invention water may be added to the cosolvent to improve the solubility of the stannous chloride therein. The reaction mixture is mixed continuously until the reduction reaction is completed and the mixture is then acidified with a base-binding agent, such as dilute sulfuric acid, or mixtures of dilute sulfuric acid and glacial acetic acid, at low temperature, preferably below 35°C. Preferably the acidification is carried out by the addition of glacial acetic acid, followed by the addition of dilute sulfuric acid. The precipitated product is then collected, washed with an organic solvent and dried by conventional means.

The process of this invention results in a much higher overall yield of the bis(phenylethynyl)anthracene. For example, the yield of 9,10-bis(phenylethynyl)anthracene is about 80–85 percent versus about 42–71 percent for the prior art process. In addition to the significant increase in yield, the process is improved over the prior art in that isolation of the intermediate dihydrodiol is not required, the reaction time is greatly reduced, the amount of phenyacetylene used is greatly reduced, and the purity of the final product is improved. The following examples describe in detail the process of this invention and the process of the prior art.

EXAMPLE 1

Preparation of 9,10-bis(phenylethynyl)anthracene

To 100 ml of dioxane are added 17.95 g (0.176 mole) of phenylacetylene and 4.0 g (0.174 mole) of lithium amide, and the solution is heated at reflux for 2 hours. The solution is cooled to 50°C. and 16.64 g (0.08 mole) of 9,10-anthraquinone is added portionwise followed by the addition thereto of 100 ml of N,N-dimethylformamide. The reaction mixture is stirred at 50°C. for 4 hours and the solution is then cooled to 25°C.

A solution of 34.16 g (0.15 mole) of stannous chloride dihydrate in 68 ml of N,N-dimethylformamide is added thereto and the resulting solution is stirred at 23°–25°C. for about 15 hours while protected from light.

To the reaction mixture are added 10.16 g of glacial acetic acid and then 68 ml of 8N sulfuric acid. The orange-colored precipitate is collected by filtration, washed with 150 ml of methyl alcohol and dried to obtain 20.6 g of product, 68 percent overall yield, mp 248°–250°C.

EXAMPLE 2

Preparation of 9,10-bis(phenylethynyl)anthracene By Prior Art Process

The preparation of 9,10-bis(phenylethynyl)anthracene as set forth in U.S. Pat. No. 3,729,426 is shown below:

Step 1: Preparation of 9,10-dihydro-9,10-dihydroxy-9,10-bis(phenylethynyl-)anthracene To a suspension of 11.5 g (0.50 mole) of lithium amide in 600 ml of anhydrous dioxane is added 51.0 g (0.50 mole) of phenylacetylene in 100 ml of dioxane. After the addition is completed, the mixture is heated at reflux for 2 hours. To the warm mixture is added 52.0 g (0.50 mole) of 9,10-anthraquinone and the mixture is heated at reflux for 16 hours. The mixture is then cooled and the cooled mixture is treated with 1 liter of 0.5 M aqueous ammonium chloride solution. The product is filtered off and washed with water. Recrystallization from acetonitrile gives colorless crystals, in an overall yield of 47 percent, mp 220°C. (lit. mp 206°–207°C.).

Step 2: Preparation of 9,10-bis(phenylethynyl)anthracene

An amount of 5 g (0.012 mole) of 9,10-dihydro-9,10-dihydroxy-9,10-bis(phenylethynyl)anthracene is dissolved in 50 ml of dioxane and the solution is slowly added to a solution of 10 g of stannous chloride dihydrate in 75 ml of 50 percent aqueous acetic acid. An organic solid precipitates and after stirring at room temperature for 1 hour it is collected by filtration. Recrystallization of the solid from benzene gives orange crystals in a yield of 85 percent, mp 250°–251°C. The overall yield for the two-step process is 40 percent.

EXAMPLE 3

Preparation of 1-chloro-9,10-bis(phenylethynyl)-anthracene

To 75 ml of dioxane are added 13.3 g (0.13 mole) of phenylacetylene and 2.99 g (0.13 mole) of lithium amide and the mixture is refluxed for 2 hours. The solution is cooled to 40°–50°C. and 14.5 g (0.06 mole) of 1-chloro-9,10-anthraquinone is added portionwise followed by the controlled addition of 75 ml of N,N-dimethylformamide so that the temperature of the reaction mixture does not exceed 50°C. The reaction mixture is stirred at 50°C. for 4 hours after the addition of the N,N-dimethylformamide is completed. The solution is cooled to 25°C. and slowly added to a slurry of 38.8 g (0.15 mole) of stannous chloride dihydrate in a mixture of 50 ml of dimethylformamide and 5 ml of water. The resulting dark solution is stirred at room temperature for 16 hours while protected from light.

To the reaction mixture are added 50 ml of glacial acetic acid and the solution is slowly stirred for about 5 minutes. This is followed by the addition thereto of 50 ml of 8N sulfuric acid. The orange-colored precipitate is collected by filtration, washed with 50 ml of methyl alcohol and dried to obtain 19.5 g of product (78.6 percent yield), having a mp of 202.5°–204°C.

EXAMPLE 4

Preparation of 1-chloro-9,10-bis(phenylethynyl)-anthracene

To 9.2 liters of dioxane are added 367.6 g (16.0 moles) of lithium amide and 1629 g (16.0 moles) of phenylacetylene. The mixture is heated at reflux temperature for 2 hours, then cooled to 70°C. and 1776 g (7.3 moles) of 1-chloro-9,10-anthraquinone are added. To this reaction mixture are added 7.5 liters of N,N-dimethylformamide and the mixture is stirred and cooled to 50°C., and then maintained at 50°C. for 4 hours.

To 6.1 liters of N,N-dimethylformamide are added 3300 g (14.6 moles) of stannous chloride dihydrate and the solution is clarified by filtration. The clear filtrate is added to the reaction mixture and the reaction mixture is stirred at 20°–25°C. for 15 hours. At the end of this time, 6.1 liters of glacial acetic acid and 6.1 liters of 8N sulfuric acid are added to the reaction mixture in that order to obtain a reddish-colored precipitate. The solid precipitate is filtered, pressed dry and then slurried in 15 liters of methanol. After slurrying for 2 hours, the solid is collected by filtration and dried in a forced air oven at 60°–65°C. There is obtained 2611 g of product (86.6 percent yield) having a melting point of 200°–202°C.

EXAMPLE 5

Preparation of
1-chloro-9,10-bis(phenylethynyl)-anthracene by Two-Step Process

Step 1: Preparation of
1-chloro-9,10-dihydro-9,10-bis(phenylethynyl)anthracene

A mixture of 13.26 g (0.13 mole) of 98 percent phenylacetylene, 2.99 g (0.3 mole) of lithium amide and 75 ml of dioxane is refluxed for 2 hours. The mixture is cooled to 80°C. and 12.1 g (0.05 mole) of 1-chloroanthraquinone is added portionwise. As the mixture is cooled to 30°–40°C., a gel forms. To the reaction mixture is added slowly 75 ml of N,N-dimethylformamide while keeping the temperature of the mixture below 50°C. When all of the N,N-dimethylformamide has been added, the gel dissolves and stirring at 50°C. is continued for 4 hours. The deep red solution is poured into 750 ml of water and an oil forms which crystallizes on standing overnight. The crude product is dissolved in approximately 300 ml of isopropyl alcohol and upon cooling yields 13.7 g of tan crystals, melting point 186°–188°C. The filtrate is concentrated to 175 ml and diluted with water and on cooling another 4.0 g of product, melting point 168°–180°C., precipitates out. The total yield of dihydro diol is 17.7 or 79 percent.

Step 2: Preparation of
1-chloro-9,10-bis(phenylethynyl)-anthracene

An amount of 5 g (0.011 mole) of 1-chloro-9,10-dihydro-9,10-dihydroxy-9,10-bis(phenylethynyl)anthracene is dissolved in 10 ml of N,N-dimethylformamide and the solution is added dropwise to a slurry of 8.6 g (0.038 mole) of stannous chloride dihydrate in 20 ml of N,N-dimethylformamide. The empty flask is rinsed with 3 ml of N,N-dimethylformamide and the rinse solution is added to the reaction mixture and the mixture is stirred at 20°–25°C. for 8 hours while protected from light.

The solution is then treated successively with 8 ml of glacial acetic acid and 8 ml of 8N sulfuric acid, stirred at room temperature for about 5 minutes and the precipitate is collected by filtration. The product is washed with 25 ml of methyl alcohol and dried to obtain 4.1 g (90 percent yield), melting point 203°–204°C. The overall yield for Steps 1 and 2 is 71.1 percent.

EXAMPLE 6

Preparation of
2-ethyl-9,10-bis(phenylethynyl)-anthracene

The procedure of Example 1 is used except that 18.8 g (0.08 mole) of 2-ethyl-9,10-anthraquinone is used instead of 9,10-anthraquinone. The product is collected by filtration, washed with 165 ml of methyl alcohol and dried to obtain 25.7 g of the desired product (79 percent yield) having a melting point of 169°–171°C.

I claim:

1. A method of preparing bis(phenylethynyl)anthracenes comprising (1) reacting a quinone with the lithium salt of phenylacetylene at moderately elevated temperatures in a solvent mixture of dioxane and an amide cosolvent to obtain the corresponding dihydro-dihydroxybis(phenylethynyl)anthracene, (2) reducing the latter compound in situ to the corresponding bis(phenylethynyl)anthracene, (3) acidifying the reaction mixture with a suitable base-binding agent or mixture of base-binding agents to precipitate the latter compound, and (4) recovering said bis(phenylethynyl)anthracene therefrom.

2. A method according to claim 1 wherein (1) the reaction between the alkali phenylacetylide and the quinone is effected in a mixture of dioxane and N,N-dimethylformamide, (2) the reduction is effected in situ with stannous chloride dihydrate, as a solid, or in a suitable solvent, or mixture of solvents, and (3) the acidification is effected by the reaction with acetic acid, or dilute sulfuric acid, or mixtures thereof.

3. A method of preparing 9,10-bis-(phenylethynyl)anthracenes of the formula

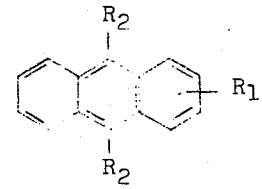

in which $R_1$ is hydrogen, alkyl $C_1$–$C_4$, aryl or halogen, and $R_2$ is phenylethynyl, comprising (1) forming the lithium salt of phenylacetylene in dioxane solvent, (2) reacting an appropriately substituted 9,10-anthraquinone with said lithium salt of phenylacetylene at moderately elevated temperatures in a solvent mixture of dioxane and an amide cosolvent to obtain the corresponding 9,10-dihydro-9,10-dihydroxy-9,10-bis(phenylethynyl)anthracene, (3) reducing the latter compound in situ to the corresponding 9,10-bis(phenylethynyl)anthracene, (4) acidifying the reaction mixture with a suitable basebinding agent, or agents, to precipitate the corresponding 9,10-bis(phenylethynyl)anthracene and (5) recovering said 9,10-bis(phenylethynyl)anthracene therefrom.

4. A method according to claim 3 wherein (1) said reaction between the lithium salt of phenylacetylene and the 9,10-anthraquinone is effected in a mixture of dioxane and N,N-dimethylformamide.

5. A method of preparing 9,10-bis(phenylethynyl)-anthracenes as in claim 3, comprising (1) forming the lithium salt of phenylacetylene by refluxing lithium amide and phenylacetylene in dioxane until the reaction is completed, (2) reacting an equivalent amount of an appropriately subsitituted 9,10-anthraquinone with said lithium salt of phenylacetylene in a mixture of dioxane and N,N-dimethylformamide at 25°C. to 50°C. for a period of 4 hours to 16 hours to form the corresponding 9,10-dihydro-9,10-dihydroxy-9,10-bis(phenyl-ethynyl)anthracene, (3) cooling the reaction mixture to about 25°C. to 35°C., (4) reacting the latter compound with an equivalent amount of stannous chloride dihydrate at 20°C. to 40°C., for a period of 2 hours to 16 hours, (5) acidifying the reaction mixture with dilute sulfuric acid or mixtures of dilute sulfuric acid and glacial acetic acid, and (6) collecting the precipitated 9,10-bis(phenylethynyl)-anthracene therefrom.

6. A method according to claim 5 wherein the 9,10-anthraquinone is 1-chloro-9,10-anthraquinone.

7. A method according to claim 5 wherein the 9,10-anthraquinone is 9,10-anthraquinone.

8. A method according to claim 5 wherein the 9,10-anthraquinone is 2-ethyl-9,10-anthraquinone.

9. A method according to claim 5 wherein the reaction between said lithium salt of phenylacetylene and said 9,10-anthraquinone is effected between 25°C. and 50°C. for a period of 4 to 16 hours.

10. A method according to claim 5 wherein the mole ratio of stannous chloride dihydrate to 9,10-anthraquinone is from 1 to 4 and the reduction reaction is conducted between room temperature and 40°C. for a period of 2 hours to 16 hours.

11. A method according to claim 5 wherein the acidification comprises adding to the reaction mixture glacial acetic acid and dilute sulfuric acid at a temperature from 5°C. to 35°C.

* * * * *